(12) United States Patent
Osborne

(10) Patent No.: US 7,400,113 B2
(45) Date of Patent: Jul. 15, 2008

(54) BATTERY MANAGEMENT UNIT, SYSTEM AND METHOD

(75) Inventor: Jeffrey Roger Osborne, Wellington (NZ)

(73) Assignee: Designline International Holdings, LLC, Charlotte, NC (US)

( * ) Notice: Subject to any disclaimer, the term of this patent is extended or adjusted under 35 U.S.C. 154(b) by 146 days.

(21) Appl. No.: 10/473,119

(22) PCT Filed: Mar. 28, 2002

(86) PCT No.: PCT/NZ02/00046

§ 371 (c)(1),
(2), (4) Date: Apr. 19, 2004

(87) PCT Pub. No.: WO02/080332

PCT Pub. Date: Oct. 10, 2002

(65) Prior Publication Data

US 2004/0164706 A1    Aug. 26, 2004

(30) Foreign Application Priority Data

Mar. 30, 2001 (NZ) .................................. 510848

(51) Int. Cl.
*H01M 10/46* (2006.01)
(52) U.S. Cl. ........................................ 320/118
(58) Field of Classification Search ................ 320/116, 320/118, 119, 120, 122, 123
See application file for complete search history.

(56) References Cited

U.S. PATENT DOCUMENTS

| 5,504,415 | A | * | 4/1996 | Podrazhansky et al. ..... 320/118 |
| 5,578,915 | A |   | 11/1996 | Crouch et al. |
| 5,900,716 | A | * | 5/1999 | Collar et al. ................ 320/118 |
| 6,081,095 | A | * | 6/2000 | Tamura et al. ............... 320/118 |
| 6,114,835 | A | * | 9/2000 | Price .......................... 320/118 |

FOREIGN PATENT DOCUMENTS

| EP | 588 615 | 3/1994 |
| EP | 807 546 | 11/1997 |

(Continued)

OTHER PUBLICATIONS

"A Review of Cell Equalization Methods for Lithium Ion and Lithium Polymer Battery Systems"; Moore Et Al; SAE 2001 World Congress Mar. 5-8, 2001.

*Primary Examiner*—Edward Tso
(74) *Attorney, Agent, or Firm*—Nixon & Vanderhye P.C.

(57) ABSTRACT

A battery management unit and system for managing the state of charge of cells or batteries. Each battery management unit measures cell or battery terminal voltage and provides this information to a central controller via a communication medium. Each battery management unit monitors a plurality of batteries and can selectively charge a selected battery via a charger and switch circuit or can selectively discharge a selected battery via a load and switch circuit under the control of a controller. The controller may control charging and discharging in accordance with measurements from voltage sensors or may convey information from a voltage sensors to the central controller and receive charging and discharging commands from the central controller. Charging and discharging is controlled to maintain all batteries within a desired state of charge ranged. The central controller may selectively connect a main charger or generator to a bank of batteries associated with a battery management unit.

28 Claims, 2 Drawing Sheets

FOREIGN PATENT DOCUMENTS

| | | |
|---|---|---|
| EP | 863 598 | 9/1998 |
| EP | 953 472 | 11/1999 |
| FR | 2 797 096 | 2/2001 |
| GB | 2 337 166 | 11/1999 |
| WO | 95/15604 | 6/1995 |
| WO | 96/22625 | 7/1996 |

* cited by examiner

BATTERY MANAGEMENT UNIT, SYSTEM AND METHOD

This application is the US national phase of international application PCT/NZ02/00046, filed Mar. 28, 2002, which designated the US. PCT/NZ02/00046 claims priority to New Zealand Application No. 510848, filed Mar. 30, 2001. The entire contents of these applications are incorporated herein by reference.

FIELD OF THE INVENTION

The invention relates to battery management systems and in particular to a system and method for managing the operation of batteries in electric vehicle applications.

BACKGROUND TO THE INVENTION

Electric vehicles are known in the art. They include one or more battery that supplies energy to one or more electric motors that in turn provide motive force to the vehicle. Each battery is generally charged overnight for use during the day. In these vehicles each battery can undergo regular deep cycling of its state of charge and thus each battery life expectancy is typically short. It is undesirable to discharge a battery too far as this also shortens battery life.

Hybrid electric vehicles are known. One type of hybrid vehicle includes an auxiliary power unit that can be used to generate energy during use of the vehicle. This energy can be used to supplement battery energy or to charge the battery. With the availability of an auxiliary power unit within the vehicle it is desirable to have a battery management system which regulates battery and auxiliary power unit operation and avoids overcharging of the batteries, which can reduce battery life.

A number of battery management systems are known, however they generally only perform any real control during overnight charging. During use the auxiliary power unit is often run continuously at a predetermined and fixed power output. This can result in overcharging of the battery. Alternative schemes only run the auxiliary power unit if the battery voltage, or state of charge, falls below a predetermined level. This does not overcome problems with state of charge cycling.

In the publication "Distributed VRLA Battery Management Organisation with Provision for Embedded Internet Interface" (Anbuky et al.) IEEE, Telecommunications Energy Conference (INTELEC 2000) there is disclosed a distributed system for gathering and storing state of charge information. Data analysis is distributed rather than centralised and there is no disclosure of a charging strategy to achieve state of charge equalisation.

WO 99/01918 discloses a battery management system in which individual cells may be selectively connected to a single cell battery charger or a variable load bank. However, connection to the single cell battery charger or variable load link is simply for determining the capacity of each battery rather than for performing any equalisation of the state of charge of batteries.

U.S. Pat. No. 5,701,068 discloses a battery management system in which each battery has an associated battery module for monitoring the battery and charging the battery. This is an expensive and complex system.

U.S. Pat. No. 6,043,628 discloses a battery management system in which a bypass arrangement is provided for each battery to reduce overcharging of selected batteries whilst allowing the remaining batteries to be charged. This requires an individual module with a bypass resistor arrangement for each cell and does not allow the selective charging of selected batteries.

U.S. Pat. No. 6,078,165 is a system for monitoring and charging only. No discharge capability is disclosed.

EP0798839A2 discloses a battery management system in which an individual battery module is required for each battery making it expensive and complex.

It is an object of the present invention to provide a battery management system that controls battery operation in a hybrid electric vehicle to optimise battery performance and extend the battery life.

It is a further object of the present invention to provide a battery management system for hybrid electric vehicles that overcomes, or at least ameliorates, the above mentioned problems with the prior art.

The above objections are to be read disjunctively with the object of at least providing the public with a useful alternative.

SUMMARY OF THE INVENTION

According to a first aspect of the invention there is provided a battery management unit for managing the state of charge of a plurality of cells or batteries connected thereto including:
  a state of charge sensor for measuring the state of charge of the cells or batteries;
  a multiplexer for selectively connecting the state of the charge sensor to a cell or battery to be measured;
  a charger for charging a cell or battery;
  a discharger for discharging a cell or battery;
  a controller which selectively connects the state of charge sensor to a cell to be measured via the multiplexer, receives state of charge information from the state of charge sensor and selectively connects the charger or the discharger to a cell or battery to dynamically maintain the state of charge of the cells or batteries within a predetermined range.

According to a further aspect of the invention there is provided a method of charging and equalising the state of charge of a plurality of cells or batteries comprising the steps of:
  i simultaneously charging the cells or batteries by a main charger; and
  ii discharging the cell or battery having the highest terminal voltage, above a high voltage threshold, for a predetermined period until all cells or batteries are below the high voltage threshold.

According to another aspect the invention provides for a system for managing the operation of a battery comprising two or more series connected cell or battery groups including:
  two or more battery management units connected to an associated battery group, the local apparatus including a local processor operable to measure one or more cell and/or ambient variable parameters and control charge and/or discharge of the one or more cells or batteries within the group; and
  a central processor in communication with two or more local processors; and wherein,
  the central processor is responsive to one or more cell and/or ambient variable parameters to dynamically control the supply of energy to the two or more series connected battery groups; and/or local processors are responsive to one or more cell and/or ambient variable parameters or transmitted control data to control charge and/or discharge of the one or more cells or batteries within a group substantially independently of the supply of energy to the two or more series connected battery groups.

Preferably the system includes a main charger, the central processor dynamically controlling the supply of energy to the two or more series connected battery groups via the main charger.

Preferably the system includes an auxiliary power unit, alternatively the central processor dynamically controlling the supply of energy to the two or more series connected battery groups via the auxiliary power unit. More preferably the central processor either continuously or periodically estimates the energy removed from the two or more series connected battery groups and dynamically varies the auxiliary power unit output power to substantially maintain a substantially constant state of charge of the two or more series connected battery groups.

According to a first particular aspect the invention provides for a system for managing the operation of a battery comprising two or more series connected cell or battery groups including:
- two or more battery management units, each connected to an associated battery group, the unit including:
  - a local charger,
  - a local discharger,
  - a switch for electrically connecting the local charger or local discharger individually to one or more cells or batteries within the group,
  - sensors for measuring one or more cell and/or ambient variable parameters within the group, and
  - a local processor in communication with the local charger, discharger, switch, and sensors and being operable to control the charger, discharger and switch;
- a main charger for supplying energy to the two or more series connected battery groups; and
- a central processor in communication with two or more units and the main charger and being responsive to battery condition to manage operation of the battery.

Preferably the system includes a common communication medium, the central processor and local processors being connected to the common communication medium and each processor being operable to communicate with another processor or simultaneously to all processors connected to the medium.

Preferably the central processor is in communication with one or more local processor to receive information about one or more cell and/or ambient variable parameters and being responsive to said information to manage operation of the battery.

The central processor may be responsive to individual cell and/or variable parameters to manipulate the supply of energy from the main charger means to the two or more series connected battery groups, and/or transmit control data to one or more local processor dictating control of the one or more cells or batteries within the groups. Alternatively, the central processor may manipulate the supply of energy from the main charger to the two or more series connected battery groups and the local processor means may be responsive to reference information to control of the one or more cells or batteries within the groups.

Preferably the local processor can manipulate the supply and/or removal of energy to/from an individual cell or battery within its group independent of operation of any other group or the main charger. It is envisaged that preferably, although not exclusively, the switch is a multiplexer adapted to connect either the local charger or local discharge to any individual cell or battery within the group, the multiplexer being manipulated by the local processor.

According to a further aspect the invention provides for a method for managing the operation of a battery comprising two or more series connected cell or battery groups including:
- connecting a battery management unit to each of two or more battery groups, each said unit including:
  - a local charger;
  - a local discharger,
  - a connector for electrically connecting the local charger or local discharger individually to one or more cells or batteries within the group,
  - local sensors for measuring one or more cell and/or ambient variable parameters within the group, and
  - a local processor in communication with the charger, discharger, connector, and sensor and being operable to control operation of said means and the one or more cells or batteries within the group;
- connecting a main charger to the battery;
- providing a central processor in communication with the unit; and wherein
- periodically or continuously the two or more unit measure one or more cell and/or ambient variable parameters of the two or more series connected battery groups and communicate said parameters to the central processor; and
- relating said parameters to reference criteria and in response the central processor dynamically controls the supply of energy to the two or more series connected battery groups; and/or local processor manipulates the charge and/or discharge of the one or more cells or batteries within a group substantially independently of the supply of energy to the two or more series connected battery groups Preferably the central processor initiates the measuring of one or more cell and/or ambient variable parameters and the communication of said parameters to the central processor.

Preferably the central processor initiates and terminates the charge or discharge of one or more cells of batteries within a group.

Preferably the system includes a main charger, the central processor dynamically controlling the supply of energy to the two or more series connected battery groups via the main charger.

Preferably the system includes an auxiliary power unit, alternatively the central processor means dynamically controlling the supply of energy to the two or more series connected battery groups via the auxiliary power unit. More preferably the central processor either continuously or periodically estimates the energy removed from the two or more series connected battery groups and dynamically varies the auxiliary power unit output power to substantially maintain a substantially constant state of charge of the two or more series connected battery groups.

According to a further aspect the invention provides for a hybrid electric vehicle including a battery management system or method as hereinbefore defined.

Further aspects of the invention will become apparent from the following description which is given by way of example only.

BRIEF DESCRIPTION OF THE DRAWINGS

The invention will now be described with reference to the accompanying drawings in which.

DESCRIPTION OF THE PREFERRED EXAMPLE

A specific example of the invention will now be described with reference to FIGS. 1 and 2, in which like numerals represent like integers. The invention will be described with reference to a particular set-up of a hybrid electric vehicle in which the battery comprises two parallel strings 18 and 19 of forty series connected 12-volt batteries. This is not critical to the invention, however, and it will become apparent to the skilled addressee that the invention is equally applicable to other battery configurations.

Figure 1:
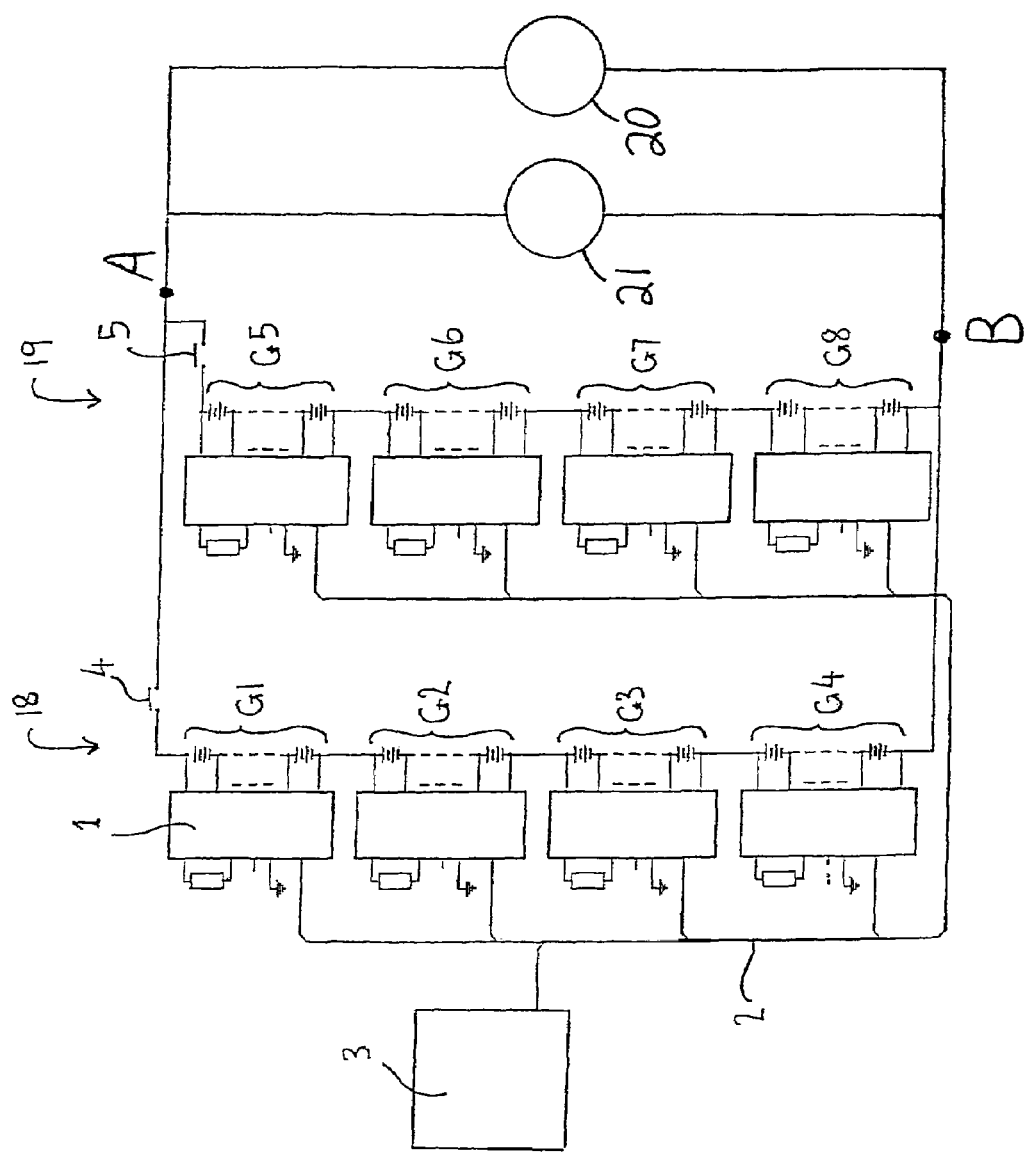
FIG. 1; illustrates a schematic overview of the hardware from a battery management system according to the invention.

Referring to FIG. 1, there shown is a schematic overview of the hardware from a battery management system according to the invention. The battery comprises eighty 12-volt batteries configured in two parallel strings 18 and 19 of forty series connected 12-volt batteries. Each string 18 and 19 is further divided into four groups G1-G4 and G5-G8 comprising ten series connected 12-volt batteries. According to this battery configuration the output voltage between Bus nodes A and B is 480-volts DC. Relays 4 and 5 allow isolation of each 480-volt battery string 18 and 19.

In communication with each ten battery group is a battery management unit 1, which for the purpose of this description shall be referred to as a remote management unit 1. Each remote management unit 1 is connected to an RS485 communications medium 2, typically in the form electrical conductors. Also connected to the communications medium 2 is a central controller, typically a programmable logic controller.

The system also includes a main battery charger 20 and an auxiliary power unit 21, both of known type, connected to the DC Bus nodes A and B. The main battery charger and auxiliary power unit are controllable by central controller 3.

Figure 2:
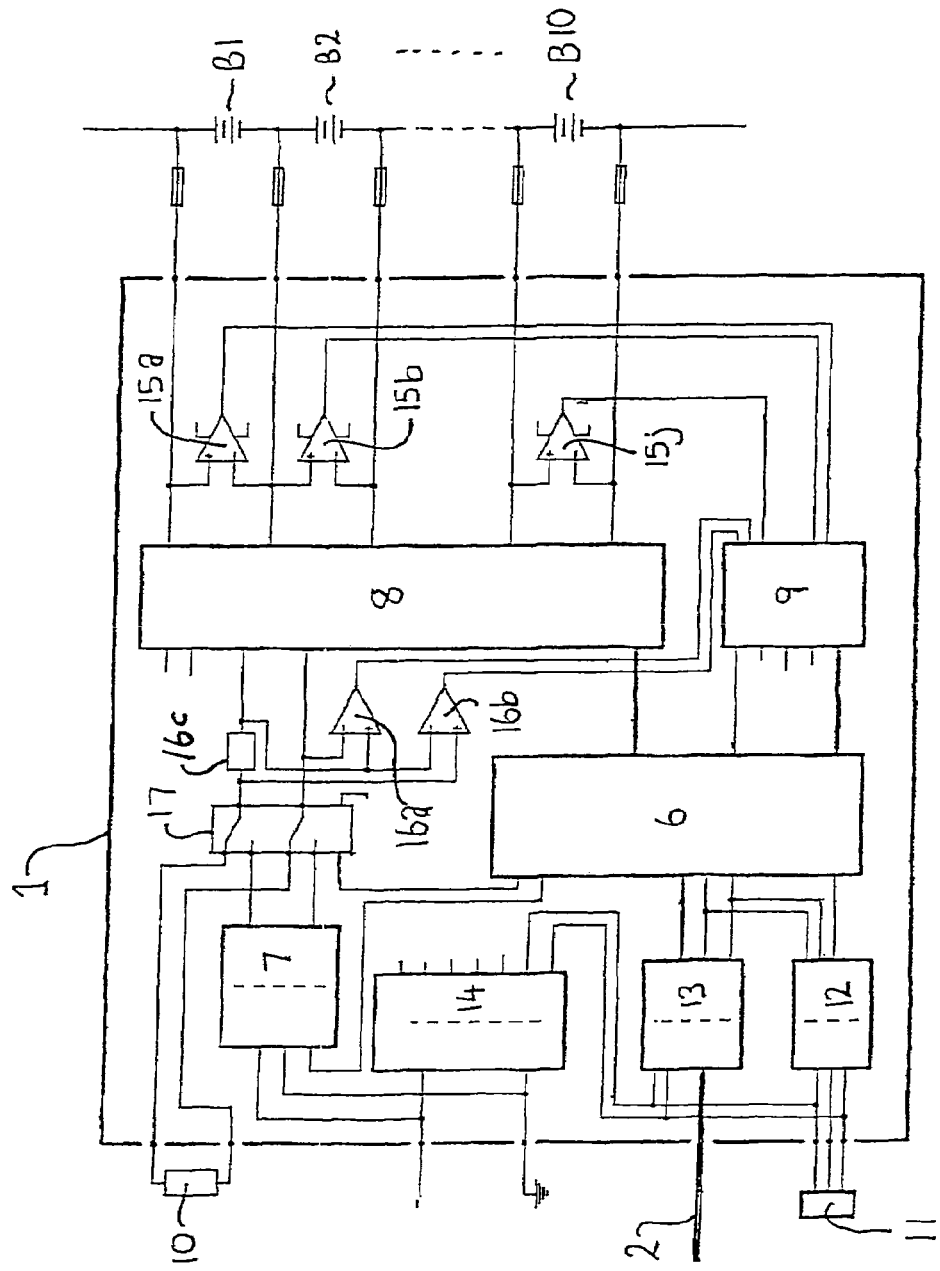
FIG. 2 illustrates a schematic overview of a remote management unit of the battery management system illustrated in FIG. 1.

Referring to FIG. 2, there is shown a schematic overview of the hardware within a remote management unit 1. Each remote management unit 1 includes a local battery charger 7 and discharger, in form of discharge resister 10, either of which can be electrically connected, via a multiplexer relay 8, to any one of batteries B1 to B10 within the corresponding battery group. A relay 17 is operable to electrically connect either of battery charger 7 or discharge resister 10 to the common input of multiplexer relay 8, which in turn is operable to electrically connect its common input to any one of ten outputs corresponding to the ten batteries B1 to B10. Both relay 17 and multiplexer relay 8 are controlled by a local micro-controller 6. Thus charger 7 or discharge resistor 10 can be selectively connected across the terminals of any one of batteries B1 to B10.

The voltage of each battery in a group can be detected by differential amplifiers 15a to 15j. Two further differential amplifiers 16a and 16b (measuring the voltage drop across reference resistor 16c to determine current) are adapted to measure the voltage and current at the multiplexer relay 8 common input. An analogue multiplexer 9 is used to combine the outputs from each differential amplifier 15a to 15j, 16a and 16b, and scale their signal inputs into micro-controller 6. In the current embodiment the differential amplifiers are designed to measure voltages in the order of 0-16 volts which are scaled to 0-2.5 volts at the micro-controller 6 analogue input.

A temperature probe 11 detects the common temperature of batteries B1 to B10 in the battery group. The temperature probe 11 signal is coupled to micro-controller 6 via an analogue isolation amplifier 12.

The micro-controller 6 can communicate with the central controller 3 via an RS485 interface 13 connected to communications medium 2. In the preferred embodiment the central controller 3 initiates all communications on medium 2. However, it is envisaged that in an alternative embodiment two or more micro-controllers 6 may communicate with each other.

Each remote management unit 1 includes a power supply module 14 that provides multiple voltage outputs to meet the power requirements of components within the remote management unit 1.

By the above configuration each remote management unit 1 has the ability to measure individual battery B1 to B10 voltages and the temperature of each battery group. This information is transmitted via communication medium 2 to central processor 3. The remote management unit 1 can also control local charge or discharge of any individual battery B1 to B10 within its group. This distributed data acquisition has the advantage of reducing the overall wiring needed to detect all eighty individual battery voltages directly at the central controller 3, as well as the cost of additional controller 3 inputs.

In the preferred embodiment of the invention a number of communication transactions are envisaged that enable the central controller 3 and micro-controllers 6 from each remote management unit 1 to communicate the required information for charge management of the battery. The communication transactions are described below.

It is desirable, but not crucial to the invention, that individual battery voltages are measured simultaneously. While this is not possible within a battery group because of the use of multiplexing, it is envisaged that a remote management unit 1 will be able to consecutively sample each of its ten battery voltages within a few tens of milliseconds. To ensure that each remote measurement unit 1 is synchronised to sample voltages simultaneously a "sample battery voltages" command is issued on the communications medium 2 by the central controller 3. The remote management unit 1 also samples the group temperature at this time.

The sampled battery voltages and temperature are stored in a data table within local micro-controller 6 memory. The data table also includes status information that will identify any fault conditions such as multiplexer relay failure, charger failure and the like. The central controller 3 polls each remote management unit 1, in turn, requesting that it transmit its information data table.

With access to individual battery information it is envisaged that the central controller 3 can make determinations on equalisation of individual batteries within a group. An "equalisation request" can be issued to an individual remote management unit 1 directing it to connect an individual battery to the local charger 7 or discharge resister 10 for equalisation purposes.

The following discussion relates to the scheme employed by the battery management system for management of the hybrid vehicle battery. As a preliminary point, individual battery voltages are sampled and transmitted to the central controller 3 at a rate of once every second. Also, the central controller 3 recognises two modes of operation: overnight charge control and in-use control.

The central controller 3 identifies an overnight charge situation When it detects that an external voltage source has been connected to the vehicle and the vehicle ignition switch is in the off position. The central controller 3 activates a main charger connected to lines A,B to charge the batteries. The charge current is gradually increased until the charger reaches its maximum output or until any individual battery voltage reaches 14.7 volts. Above this voltage it is envisaged that a battery will be overcharging with some of the energy supplied being consumed in unwanted overcharge reactions that amongst other things causes gassing which results in plate damage, reduced liquid level and reduced battery life.

During the overnight charge process the central controller 3 is continually receiving updates of individual battery voltages and group temperature information and dynamically controlling the charge current of the main charger to ensure the maximum individual battery voltage is no higher than 14.7 volts. Eventually the main charger output will reduce until it is merely maintaining a float voltage of 14.7 volts. This strategy is continued until the charger is switched off.

During the overnight charge the central controller 3 also initiates localised equalisation charge, or discharge, of individual batteries. The remote management units 1 undertake this charge, or discharge. Within each battery group G1 to G8 the individual battery with the highest voltage above 14.6 volts is connected to the discharge resister for one minute. At the end of the one-minute period the next individual battery with the highest voltage above 14.6 volts is connected to the discharge resister for a period of one minute. This may or may not be the same battery. This process is repeated within each battery group G1 to G8 until all individual battery voltages within the groups are below 14.6 volts.

After reducing all battery voltages to below 14.6 volts the local charger 7 is used to boost the charge of any individual battery having a voltage below 14.5 volts. The battery with the lowest voltage is connected to the local charger 7, which supplies a boost charge for a 15 minute period. This is repeated for the next lowest voltage battery until all battery voltages are above 14.5 volts.

It is envisaged that the central controller 3 will issue a command to each micro controller 6 indicating which battery is to be connected to the discharge resistor 10 or charger 7, and will time the period and issue the disconnect command. However, it will be apparent that these decisions may be made within the local micro-controller 6.

Equalisation of individual 12-volt batteries can also be accomplished without the benefit of an external power supply or auxiliary power unit. It is envisaged that local chargers 7 may be capable of supply from the main battery DC supply and utilise this to boost the charge on an individual battery showing a low state of charge as indicated by its terminal voltage. For an individual battery having a high state of charge the discharge resister 10 can be used to lower its state of charge.

The central controller 3 detects the in-use condition when the vehicle ignition is in the on position and there is no external supply connected to the vehicle. In this condition the central controller 3 attempts Lo maintain a constant state of charge for the battery using the auxiliary power unit. It is during this in-use period that most damage of the batteries can occur from either overcharging or over-discharge. The central controller 3 attempts to maintain the state of charge of the battery at a constant level of, say, 80%. This provides a safety margin for the battery to accept charge from regeneration in the electric motor or an overestimation of the output required from the auxiliary power unit (described later).

The central controller 3 has dynamic control over the output power of the auxiliary power unit and dynamically controls this in order to meet the demands placed on the battery. The auxiliary power unit runs continuously during the in-use period and its power output is varied at, say, 5 minute intervals. There are a variety of ways of determining what the output of the auxiliary power unit should be during any 5 minute period. These might include using historical data tables and/or fuzzy logic models. However, one method that has worked adequately is for the central controller 3 to record the power consumption during the immediately proceeding 5 minute period and set the auxiliary power unit output to replace this energy during the next 5 minute period. If this estimation scheme is initiated from a known state of charge and managed correctly it should only be necessary to dynamically vary the auxiliary power unit output to account for any over estimation or shortfall in the immediately preceding 5 minute period.

If the batteries have been well charged, and equalised, during overnight charging, and thus have similar capacity, then good battery balance should be maintained throughout a days running without any equalisation being applied. However, if the central controller 3 detects that any individual cell voltage is outside an acceptable range it can initiate a localised boost charge or discharge via the remote management units as previously described. In use however the threshold voltage levels for the equalisation procedure are reduced as appropriate.

In an electric vehicle braking or coasting will cause regeneration in the electric motor. During normal driving, say in any 5 minute period, there will be a certain amount of regeneration. This can be accounted for by reducing the auxiliary power unit output estimation and the energy from regeneration supplied back to the batteries. However, it is essential that a brake resister is available for use during regenerative braking to prevent excessively high voltages appearing across the DC Bus (i.e. the battery nodes A and B). The brake resister can be turned on during braking if the DC Bus voltage exceeds some preset value. The preset value may be dynamically variable by the central controller 3 based on individual battery voltages to avoid over voltage of any individual battery.

Turn on of the brake resister can be used as an indication that the auxiliary power unit output should be reduced.

Thus according to the above scheme there is a battery management system which regulates charging of hybrid vehicle batteries in order to avoid overcharging or excessive discharge and to minimise charge/discharge cycles. The system also allows for equalisation of individual batteries during overnight charge as well as in use. The system maintains good battery equalisation and promotes efficiency and longer battery life.

Good equalisation of individual cells or batteries within a battery group avoids the situation of an individual cell or battery becoming overcharged or excessively discharged long before the whole group.

Where in the aforegoing description reference has been made to particular elements or integers having known equivalents, then such equivalents are included as if individually set forth.

A particular example of the invention has been described and it is envisaged that improvements and/or modifications can take place without departing from the scope of the invention.

The invention claimed is:

1. A battery management unit to manage the state of charge of a plurality of cells or batteries connected thereto including:
   a state of charge sensor to measure the state of charge of the cells or batteries;
   a multiplexer to selectively connect the state of charge sensor to each of the cells or batteries to be measured;
   a charger to charge at least one of the cells or batteries;

a discharger to discharge at least one of the cells or batteries;

a controller to selectively connect the state of charge sensor to the cell or battery to be measured via the multiplexer, to receive state of charge information from the state of charge sensor and to selectively connect the charger or the discharger to one or more of the cells or batteries via the multiplexer to dynamically maintain the state of charge of the cells or batteries within a predetermined range.

2. A battery management unit as claimed in claim 1 wherein the state of charge sensor measures the voltage of each cell or battery to determine the state of charge of each cell or battery.

3. A battery management unit as claimed in claim 2 further comprising a voltage sensor to measure the voltage of each cell or battery, wherein an output of each voltage sensor is arranged to be multiplexed to the controller.

4. A battery management unit as claimed claim 1 including a temperature sensor to measure the temperature of the cells or batteries and to provide temperature information to the controller.

5. A battery management unit as claimed in claim 1 wherein the controller is configured to charge and discharge selected cells or batteries so as to maintain the state of charge of the cells or batteries within a desired range.

6. A battery management unit as claimed in claim 5 wherein the cell or battery having the lowest terminal voltage, below a predetermined low voltage threshold, is connected to the charger for a predetermined period until all cells have a terminal voltage above the low voltage threshold.

7. A battery management unit as claimed in claim 1 wherein the battery or cell having the highest terminal voltage, above a predetermined high, voltage threshold, is connected to the discharger for a predetermined period until all cells have a terminal voltage below the high voltage threshold.

8. A battery management unit as claimed in claim 1 including a power sensor to monitor the power supplied by the charger to a cell or battery and to supply the information to the controller.

9. A battery management unit as claimed in claim 1 wherein the controller includes a relay matrix to selectively connect output terminals of the charger or discharger across the selected cell or battery.

10. A battery management unit as claimed in claim 1 including a communications port to facilitate communication of battery information to a central control unit and to receive commands from the central control unit to control the charging or discharging of selected cells or batteries.

11. A battery management system comprising a plurality of battery management units as claimed in claim 1 and a central control unit, the battery management units being in communication with the central control unit via respective communication paths.

12. A system as claimed in claim 11 including a main charger to simultaneously charge a plurality of cells or batteries associated with a selected battery management unit in response to control commands from the central control unit.

13. A system as claimed in claim 11 including a generator responsive to the central control unit to charge selected cells or batteries associated with a battery management unit.

14. A system as claimed in claim 13 wherein the central control unit is configured to estimate the energy removed from the battery groups during a predetermined period and to dynamically vary the supply of power to cells or batteries associated with selected battery management units to maintain substantially equal states of charge of the battery groups.

15. A system as claimed in claim 11 wherein the central control unit is configured to receive state of charge information from each battery management unit and to control the local charging and discharging of selected cells or batteries via commands to the battery management units sent over the communication medium.

16. A system as claimed in claim 11 wherein each individual battery management unit is configured to control the charging and discharging of cells or batteries to maintain the states of charge of its associated cells or batteries within a prescribed range.

17. A method of charging and equalising the state of charge of a plurality of cells or batteries comprising:
    simultaneously charging the cells or batteries by a main charger; and
    selectively connecting, via a multiplexer, the cell or battery having the highest terminal voltage, above a high voltage threshold, to a discharger for a predetermined period until all cells or batteries are below the high voltage threshold,
    wherein each of said plurality of cells or batteries is selectively connectable to the discharger via the multiplexer.

18. A method as claimed in claim 17 wherein the state of charge of each cell or battery is determined by measuring the voltage of each cell or battery.

19. A method as claimed in claim 17 wherein cells or batteries having a state of charge below a prescribed low voltage threshold are selectively charged.

20. A method as claimed in claim 19 wherein the cell or battery having the lowest terminal voltage, below a low voltage threshold level, is charged by a secondary charger until all cells or batteries have a terminal voltage above the low voltage threshold level.

21. A method as claimed in claim 17 wherein the temperature of the cells or batteries is monitored and battery charging or discharging is controlled so that cell or battery temperature does not exceed the predetermined threshold.

22. A method as claimed in claim 17 wherein a plurality of groups of batteries are simultaneously charged so as to maintain all cells or batteries within a desired range of state of charge.

23. A method as claimed in claim 17 wherein a plurality of battery management units monitor the state of charge of each associated cell or battery and supply state of charge information to a central controller which controls the charging or discharging of cells or batteries according the state of charge information.

24. A method as claimed in claim 23 wherein the central controller selectively connects the output of a generator to selected cells or batteries based on power usage of the cells or batteries over a preceding period.

25. A method as claimed in claim 24 wherein the central controller monitors power consumption for a predetermined period and connects the generator to selected cells or batteries so as to replace the amount of energy consumed during the preceding period.

26. A method as claimed in claim 23 wherein the central control unit controls all charging and discharging of the cells or batteries.

27. A method as claimed in claim 23 wherein the central control unit controls the charging of groups of cells or batteries via the main charger or generator and battery management units control the charging and discharging of individual cells or batteries independently.

28. An electric vehicle including a battery management unit or system as claimed in claim 1.

* * * * *